(12) United States Patent
Park

(10) Patent No.: US 7,911,097 B2
(45) Date of Patent: Mar. 22, 2011

(54) VIBRATION MOTOR HAVING A CASE COMPRISING AN UPPER PLATE AND A LOWER PLATE

(75) Inventor: Young Il Park, Gunpo-si (KR)

(73) Assignee: LG Innotek Co., Ltd., Seoul (KR)

( * ) Notice: Subject to any disclaimer, the term of this patent is extended or adjusted under 35 U.S.C. 154(b) by 510 days.

(21) Appl. No.: 11/997,716

(22) PCT Filed: Aug. 30, 2007

(86) PCT No.: PCT/KR2007/004179
§ 371 (c)(1),
(2), (4) Date: Feb. 1, 2008

(87) PCT Pub. No.: WO2008/026886
PCT Pub. Date: Mar. 6, 2008

(65) Prior Publication Data
US 2010/0156209 A1    Jun. 24, 2010

(30) Foreign Application Priority Data

Aug. 31, 2006  (KR) ................ 10-2006-0083423
Sep. 25, 2006  (KR) ................ 10-2006-0092786

(51) Int. Cl.
*H02K 7/06*     (2006.01)
*H02K 33/00*    (2006.01)
*H02K 5/00*     (2006.01)
*H02K 11/00*    (2006.01)
*H01R 39/04*    (2006.01)

(52) U.S. Cl. ........ 310/81; 310/36; 310/40 MM; 310/71; 310/233

(58) Field of Classification Search ............ 310/71, 310/81, 89, 156.32–156.37, 154.05–154.06, 310/233, 268, 36, 40 MM
See application file for complete search history.

(56) References Cited

U.S. PATENT DOCUMENTS

| 6,417,589 B1 | 7/2002 | Kuyama et al. |
| 2005/0248224 A1 | 11/2005 | Park |
| 2006/0001325 A1 | 1/2006 | Joo et al. |

FOREIGN PATENT DOCUMENTS

| JP | 2001186715 A | * | 7/2001 |
| KR | 20-2000-0011430 | | 7/2000 |
| KR | 10-2002-0061272 | | 7/2002 |

(Continued)

OTHER PUBLICATIONS

Machine Translation KR2004034180 (2004) and JP2001186715(2001).*

Primary Examiner — Quyen Leung
Assistant Examiner — Jose A Gonzalez Quinones
(74) Attorney, Agent, or Firm — Saliwanchik, Lloyd & Eisenschenk

(57) ABSTRACT

Provided is a vibration motor including a supporting shaft, a rotor rotatably coupled to the supporting shaft, a stator facing the rotor, and a case having a lower plate where the supporting shaft and the stator are coupled, an upper plate facing the lower plate and the rotor, and having at least a portion having a first thickness and a portion having a second thickness greater than the first thickness at a position adjacent to the supporting shaft, and a side plate extending from the upper plate to couple to the lower plate.

16 Claims, 2 Drawing Sheets

FOREIGN PATENT DOCUMENTS

| KR | 2004034180 A | * | 4/2004 |
| KR | 10-2004-0060154 | | 7/2004 |
| KR | 10-2004-0110835 | | 12/2004 |
| KR | 10-2005-0078815 | | 8/2005 |
| KR | 10-2005-0121946 A | | 12/2005 |
| KR | 10-2005-0122340 A | | 12/2005 |
| KR | 10-2006-0093849 | | 8/2006 |

* cited by examiner

【Figure 1】
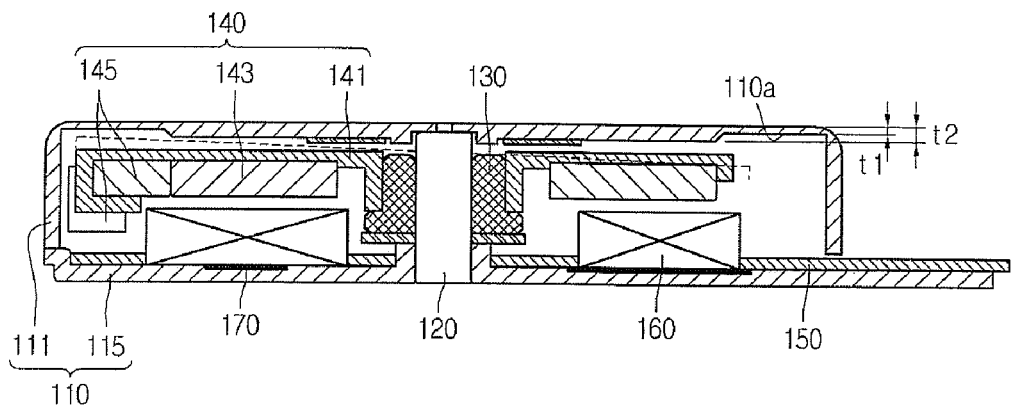
【Figure 2】
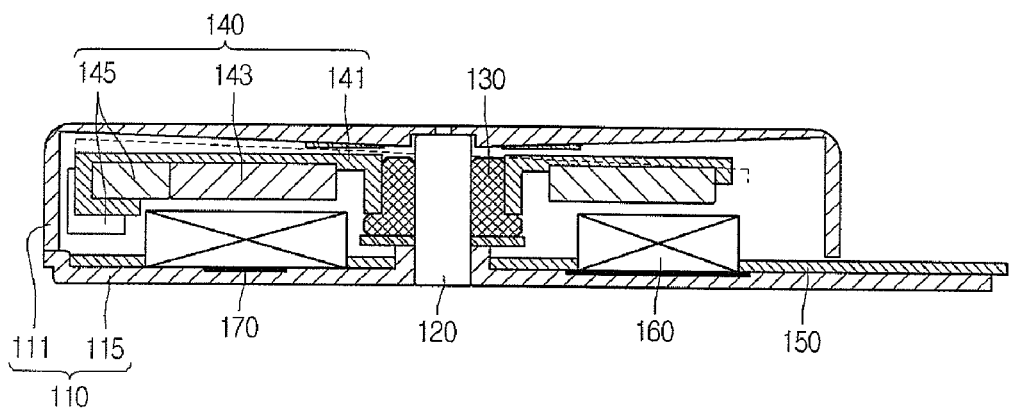
【Figure 3】
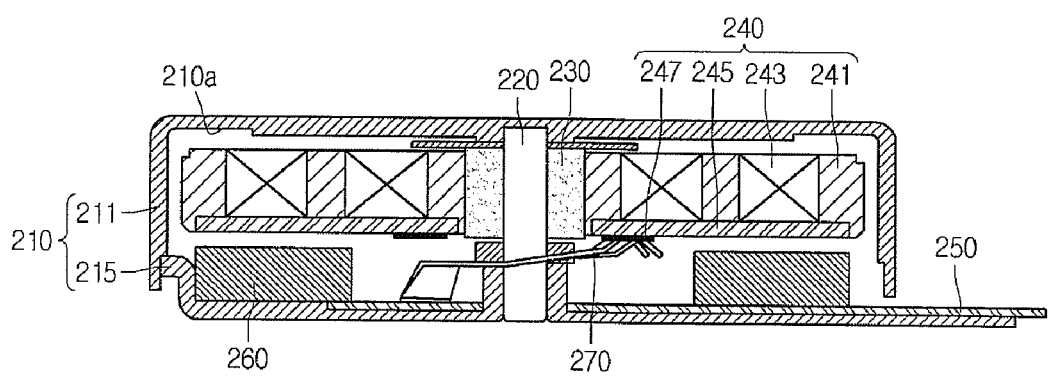

[Figure 4]
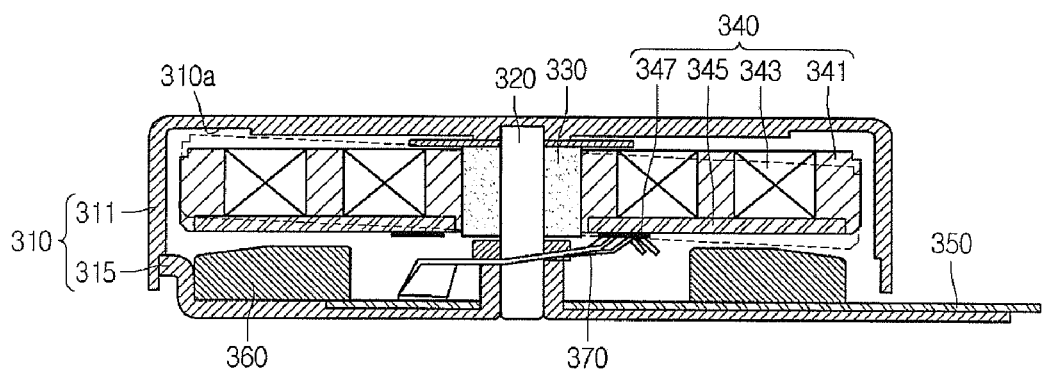
[Figure 5]
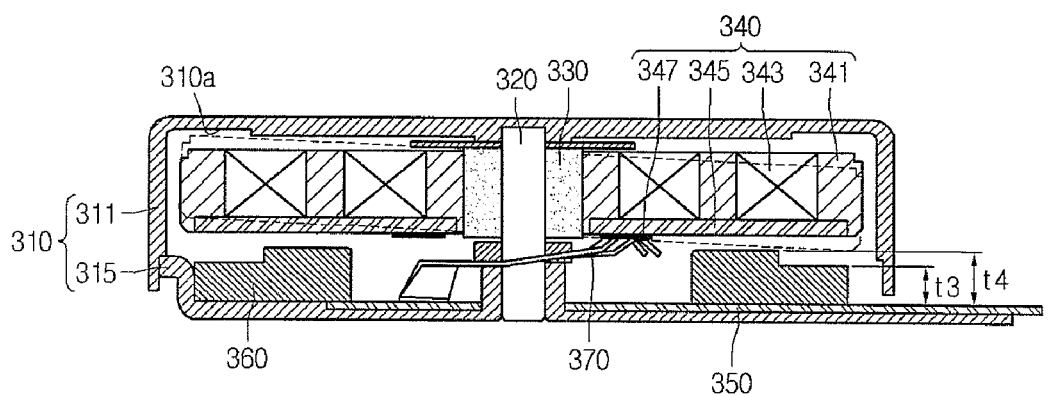

VIBRATION MOTOR HAVING A CASE COMPRISING AN UPPER PLATE AND A LOWER PLATE

Cross-Reference to Related Application

This application is the U.S. national stage application of International Patent Application No. PCT/KR2007/004179, filed Aug. 30, 2007, the disclosure of which is hereby incorporated by reference in its entirety.

TECHNICAL FIELD

Embodiments relate to a vibration motor.

BACKGROUND ART

A vibration motor is an apparatus generating a vibration. The vibration is generated while an eccentric rotor rotates due to interaction between a magnet and a coil.

For example, the vibration motor is mounted into a communication terminal and allows a user to recognize reception of a phone call by generating a vibration.

Meanwhile, as the vibration motor is miniaturized, a distance between a case and a rotor of the vibration motor decreases. Accordingly, there is a possibility that the rotor may collide with the case to cause a noise or damage the vibration motor while the rotor rotates in the vibration motor.

DISCLOSURE

Technical Problem

Embodiments provide a vibration motor.
Embodiments provide a vibration motor that can prevent a collision between a rotor and a case.

Technical Solution

In one embodiment, a vibration motor includes: a supporting shaft; a rotor rotatably coupled to the supporting shaft; a stator facing the rotor; and a case, the case comprising: a lower plate where the supporting shaft and the stator are coupled; an upper plate facing the lower plate and the rotor, having at least a portion having a first thickness, and a portion having a second thickness greater than the first thickness and more closer to the supporting shaft than the portion having the first thickness; and a side plate extending from the upper plate to couple to the lower plate.

In another embodiment, a vibration motor includes: a supporting shaft; a rotor rotatably coupled to the supporting shaft; a stator having at least a portion having a first thickness, and a portion having a second thickness greater than the first thickness and more closer to the supporting shaft than the portion having the first thickness; and a case, the case comprising: a lower plate where the supporting shaft and the stator are coupled; an upper plate facing the lower plate and the rotor; and a side plate extending from the upper plate to couple to the lower plate.

In further another embodiment, a vibration motor includes: a supporting shaft; a rotor rotatably coupled to the supporting shaft; a stator facing the rotor; and a case, the case comprising: a lower plate where the supporting shaft and the stator are coupled; an upper plate facing the lower plate and the rotor; and a side plate extending from the upper plate to couple to the lower plate, and a space between the rotor and the upper plate at a position far apart from the supporting shaft being greater than a space at a position adjacent to the supporting shaft.

ADVANTAGEOUS EFFECTS

Embodiments can prevent collision between a rotor and a case, thereby reducing noises and damages by the collision.

DESCRIPTION OF DRAWINGS

FIG. 1 is a cross-sectional view of a vibration motor according to a first embodiment.
FIG. 2 is a cross-sectional view of a vibration motor according to a second embodiment.
FIG. 3 is a cross-sectional view of a vibration motor according to a third embodiment.
FIG. 4 is a cross-sectional view of a vibration motor according to a fourth embodiment.
FIG. 5 is a cross-sectional view of a vibration motor according to a fifth embodiment.

BEST MODE

Hereinafter, preferred embodiments will be described in detail with reference to accompanying drawings.

FIG. 1 is a cross-sectional view of a vibration motor according to a first embodiment. Referring to FIG. 1, a case 110 includes an upper case 111 and a lower case 115 which are coupled to each other to form a predetermined internal space therebetween. The upper case 111 has an upper plate and a side plate. The lower case 115 has a lower plate and a side plate. A lower end of the side plate of the upper case 111 and an upper end of the side plate of the lower case 115 are coupled to each other, so that the upper plate of the upper case 111 and the lower plate of the lower case 115 form an upper plate and a lower plate of the case 110, respectively.

An upper end and a lower end of a supporting shaft 120 are respectively supported by the upper plate and the lower plate of the case 110.

A bearing 130 is disposed around the periphery of the supporting shaft 120. An eccentric rotor 140 is rotatably fixed around the bearing 130.

The bearing 130 includes an upper portion having a first thickness and a lower portion having a second thickness greater than the first thickness. The rotor 140 is coupled on a side surface of the portion having the first thickness and a top surface of the portion having the second thickness.

The rotor 140 includes a rotor yoke 141, a magnet 143, and a weight 145. The rotor yoke 141 is eccentric and fixed on the periphery of the bearing 130. The magnet 143 is fixed under the rotor yoke 141 to generate a magnetic field. The weight 145 is also fixed under the rotor yoke 141 to allow the rotor 140 to generate a larger vibration.

A substrate 150 is fixed on the top surface of the lower plate of the case 110. The substrate includes an integrated circuit (IC) (not shown), a Hall element (not shown), and the like. A stator 160, which is a coil, is fixed on the substrate 150 or the top surface of the lower plate of the case 110. The stator 160 is positioned under the magnet 140 to face the magnet 140.

The substrate 150 may be a printed circuit board (PCB).

Accordingly, when external power is supplied to the stator 160, the rotor 140 rotates due to interaction between an electric field from the stator 160 and a magnetic field from the magnet 143, thereby generating a vibration.

A cogging plate 170 is disposed on the top surface of the lower plate of the case 110.

The cogging plate 170 prevents the rotor 140 from stopping at a position where a torque generated from electromagnetic force due to the interaction between the magnet 143 and the stator 160 is zero. Accordingly, the cogging plate 170 allows the vibration motor to be stably driven.

On the other hand, since a space exists between the supporting shaft 120 and the bearing 130, the rotor 140 may rotate at a predetermined inclination from the supporting shaft with respect to a virtual horizontal line. Accordingly, a top edge portion of the rotor 140 can collide with a lower side of the upper plate of the case 110.

According to an embodiment, a lower edge of the upper plate of the case 110 facing the upper edge of the rotor 140 is formed to have a step 110a recessed upward such that the edge portion of the upper surface of the rotor 140 does not collide with the lower side of the upper plate of the case 110. In this way, the edge portion of the upper surface of the rotor 140 will not collide with the lower side of the upper plate of the case 110 even when the rotor 140 is inclined while it rotates as illustrated in a dotted line in FIG. 2.

That is, the upper plate of the case 110 has a first thickness t1 and a second thickness t2. A first portion of the upper plate of the case 110 over the weight 145 has the first thickness t1, and a second portion of the upper plate of the case 110 over the magnet 143 has the second thickness t2. At this point, the first thickness t1 is thinner than the second thickness t2.

Similarly, since the stator 160 faces the magnet 143, the upper plate over the stator 160 has the second thickness t2. FIG. 2 is a cross-sectional view of a vibration motor according to another embodiment.

Features different from FIG. 1 will be hereinafter described with reference to FIG. 2. According to the another embodiment, an upper plate of a case 110 gradually gets thinner toward the edge of the case 110. That is, the thickness of the upper plate gradually decreases toward a side plate of the case 110.

Similarly to the first embodiment, a rotor 140 may be prevented from colliding with the upper plate of the case 110.

FIG. 3 is a cross-sectional view of a vibration motor according to another embodiment. Referring to FIG. 3, a case 210 includes an upper case 211 and a lower case 215 that are coupled to each other to form a predetermined internal space therebetween. The upper case 211 has an upper plate and a side plate. The lower case 215 has a lower plate and a side plate. A lower end of the side plate of the upper case 211 and a upper end of the side plate of the lower case 215 are coupled to each other, so that the upper plate of the upper case 211 and the lower plate of the lower case 215 form an upper plate and a lower plate of the case 210, respectively.

An upper end and a lower end of a supporting shaft 220 are respectively supported by the upper plate and the lower plate of the case 210.

A bearing 230 is disposed around the periphery of the supporting shaft 220. An eccentric rotor 240 is rotatably disposed around the bearing 230.

The rotor 240 includes an eccentric base 241, a coil 243, a first substrate 245, a weight (not shown), and a commutator 247. The base 241 is fixed around the periphery of the bearing 230. The coil 243 is incorporated into the base 241 and generates an electric field. The first substrate 245 is fixed on the lower side of the base 241 and the coil 243. The commutator 247 is fixed on the lower side of the first substrate 245.

The base 241 may be formed of resin, and the first substrate 245 may be a PCB.

The rotor 240 includes one portion having a first thickness and another portion having a second thickness. A portion facing the side plate of the case 210 has the first thickness. Referring to FIG. 3, the upper edge of the rotor 240 is chamfered into an angled shape, and the lower edge of the rotor 240 is chamfered into a round shape.

That is, the thickness of the rotor 240 facing the side plate of the case 210 is less than that of a portion of the rotor 240 adjacent to the supporting shaft 220.

Accordingly, the rotor 240 can be prevented from colliding with the case 210.

A second substrate 250 is fixed on the top surface of the lower plate of the case 210.

Also, the stator 260, which is a magnet, is fixed on the second substrate 250. At this point, the stator 260 is positioned under the coil 243 to face the coil 243. A brush 270 is disposed on the second the substrate 250 and contacts the commutator 247.

Accordingly, when external power is supplied to the coil 243 via the second substrate 250, the brush 270, the commutator 247, and the first substrate 245, the rotor 240 rotates due to interaction between an magnetic field from the stator 260 and an electric field from the coil 243, thereby generating a vibration.

A lower edge of the upper plate of the case 210 facing the upper edge of the rotor 240 is formed to have a step 210a recessed upward such that the edge portion of the upper surface of the rotor 240 does not collide with the lower side of the upper plate of the case 210.

That is, similarly to the previous embodiment, the upper plate of the case 210 has a first thickness t1 and a second thickness t2 in the embodiment of FIG. 3.

Likewise, as illustrated in FIG. 2, an upper plate of a case 210 may gradually get thinner toward the edge of the case 210. That is, the thickness of the upper plate gradually decreases toward a side plate of the case 210.

FIG. 4 is a cross-sectional view of a vibration motor according to another embodiment. Referring to FIG. 4, a case 310 includes an upper case 311 and a lower case 315 that are coupled to each other to form a predetermined internal space therebetween. The upper case 311 has an upper plate and a side plate. The lower case 315 has a lower plate and a side plate. A lower end of the side plate of the upper case 311 and an upper end of the side plate of the lower case 315 are coupled to each other, so that the upper plate of the upper case 311 and the lower plate of the lower case 315 form an upper plate and a lower plate of the case 310, respectively.

An upper end and a lower end of a supporting shaft 320 are respectively supported by the upper plate and the lower plate of the case 310.

A bearing 330 is disposed around the periphery of the supporting shaft 320. An eccentric rotor 340 is rotatably fixed around the bearing 330.

The rotor 340 includes a base 341, a coil 343, a weight (not shown), a first substrate 345, and a commutator 347. The base 341 is fixed around the periphery of the bearing 330, and has an eccentric circular shape. The coil 343 is integrally disposed inside the base 341 to generate an electric field. The weight is incorporated into the base 341 and reinforces eccentric force. The first substrate 345 is fixed on the lower side of and the coil 343. The commutator 347 is fixed on the lower side of the first substrate 345.

A second substrate 350 is fixed on the top surface of the lower plate of the case 310.

Also, the stator 360, which is a magnet, is fixed on the second substrate 350. At this point, the stator 360 is positioned under the coil 343 to face the coil 343. A brush 370 is disposed on the second substrate 350, and the top end portion of the brush 370 contacts the commutator 347.

Accordingly, when external power is supplied to the coil 343 via the second substrate 350, the brush 370, the commutator 347, and the first substrate 345, the rotor 340 rotates due to interaction between an magnetic field from the stator 360 and an electric field from the coil 343, thereby generating a vibration.

Since a space exists between the supporting shaft 320 and the bearing 330, the rotor 340 may rotate at a predetermined inclination from the supporting shaft 320 with respect to a virtual horizontal line. Accordingly, a lower edge portion and a top edge portion of the rotor 340 can collide with an upper edge portion of the stator 360 and a lower edge portion of the upper plate of the case 310.

A top surface of the stator 360 is declined toward the side plate of the case 310, and a step 310a is formed in a shape recessed toward the lower side of the upper plate of the case 310 facing the upper edge of the rotor 340 such that the upper and lower edges of the upper surface of the rotor 340 may not collide with the lower side of the upper plate of the case 310 and the upper edge of the stator 360, respectively.

That is, the thickness of the stator 360 may gradually decrease toward the side plate of the case 310.

In this way, even when the rotor 340 rotates in a declined state as illustrated in dotted lines in FIG. 4, the upper and lower edges of the rotor 340 may not collide with the lower side of the upper plate of the case 310 and the upper edge of the stator 360, respectively.

FIG. 5 is a cross-sectional view of a vibration motor according to a fifth embodiment.

Only features different from FIG. 4 will be hereinafter described with reference to FIG. 5.

The stator 360 can have a third thickness t3 and a fourth thickness t4. The third thickness t3 is thinner than the fourth thickness t4. Since the upper edge of the stator 360 has the third thickness t3, the rotor 340 is prevented from colliding with the upper edge of the stator 360.

According to the embodiments, since a space between a rotor and an upper plate of the case at a position far apart from a supporting shaft is larger than a space at a position adjacent to the supporting shaft, the rotor may be prevented from colliding with the upper case.

Similarly, since a space between a rotor and a stator at a position far apart from the supporting shaft is larger than a space at a position adjacent to the supporting shaft, the rotor can be prevented from colliding with the stator.

INDUSTRIAL APPLICABILITY

The embodiments can be applied to a vibration motor.

The invention claimed is:

1. A vibration motor comprising:
a supporting shaft;
a rotor rotatably coupled to the supporting shaft;
a stator facing the rotor; and
a case, the case comprising:
   a lower plate where the supporting shaft and the stator are coupled;
   an upper plate facing the lower plate and the rotor, having at least a first portion having a first thickness, and a second portion having a second thickness greater than the first thickness and closer to the supporting shaft than the first portion having the first thickness; and
   a side plate extending from the upper plate to couple to the lower plate,
wherein an outermost surface of the rotor is farther away than a boundary between the first portion and the second portion from the supporting shaft.

2. The vibration motor according to claim 1, wherein the supporting shaft is coupled to and supported by the lower plate and the upper plate.

3. The vibration motor according to claim 1, wherein the thickness of the upper plate gradually decreases toward the side plate of the case.

4. The vibration motor according to claim 1, wherein the rotor comprises:
a rotor yoke coupled to the supporting shaft;
a magnet fixed at the rotor yoke; and
a weight coupled to the rotor yoke, and having the rotor yoke eccentric.

5. The vibration motor according to claim 1, comprising a bearing coupled to the supporting shaft to support the rotor, the bearing having a portion having a first thickness and a portion having a second thickness greater than the first thickness, and the stator being coupled to a side surface of the portion having the first thickness and a top surface of the portion having the second thickness,
wherein the portion having the second thickness is disposed at a lowermost portion of the bearing.

6. The vibration motor according to claim 1, wherein the rotor comprises:
a base coupled to the supporting shaft;
a coil coupled to the base;
a first substrate fixed on a lower side of the base;
a commutator coupled to the first substrate; and
a weight having the base eccentric.

7. The vibration motor according to claim 1, wherein the upper plate has a portion adjacent to the side plate and formed in a recessed step.

8. The vibration motor according to claim 1, wherein the rotor has a portion having a first thickness and a portion having a second thickness greater than the first thickness, the portion facing the side plate having the first thickness.

9. A vibration motor comprising:
a supporting shaft;
a rotor rotatably coupled to the supporting shaft;
a stator including a magnet, wherein the magnet has at least a portion having a first thickness, and a portion having a second thickness greater than the first thickness and more closer to the supporting shaft than the portion having the first thickness; and
a case, the case comprising:
   a lower plate where the supporting shaft and the stator are coupled;
   an upper plate facing the lower plate and the rotor; and
   a side plate extending from the upper plate to couple to the lower plate,
wherein a space between the rotor and the magnet at a position far apart from the supporting shaft is greater than a space at a position adjacent to the supporting shaft.

10. The vibration motor according to claim 9, wherein the upper plate has at least a portion having a first thickness and a portion more closer to the supporting shaft than the portion having the first thickness and having a second thickness greater than the first thickness,
wherein the portion having the first thickness of the upper plate is overlapped with the portion having the first thickness of the magnet.

11. The vibration motor according to claim 9, wherein the supporting shaft is coupled to and supported by the lower plate and the upper plate.

12. The vibration motor according to claim 9, wherein the thickness of a declined portion of the stator gradually decreases toward the side plate of the case.

13. The vibration motor according to claim 9, wherein the upper plate has a portion adjacent to the side plate and formed in a recessed step.

14. The vibration motor according to claim 9, wherein a declined portion of the stator is a magnet.

15. The vibration motor according to claim 9, wherein the rotor has a portion having a first thickness and a portion having a second thickness greater than the first thickness, and the portion facing the side plate has a first thickness.

16. A vibration motor comprising:
a supporting shaft;
a rotor rotatably coupled to the supporting shaft;
a stator including a magnet, the magnet facing the rotor; and
a case, the case comprising:
   a lower plate where the supporting shaft and the stator are coupled;

an upper plate facing the lower plate and the rotor; and
a side plate extending from the upper plate to couple to the lower plate, wherein the rotor is disposed between the upper plate and the magnet, wherein a space between the rotor and the upper plate at a position far apart from the supporting shaft is greater than a space at a position adjacent to the supporting shaft, wherein a space between the rotor and the magnet at a position far apart from the supporting shaft is greater than a space at a position adjacent to the supporting shaft.

* * * * *